Patented Sept. 10, 1940

2,214,646

UNITED STATES PATENT OFFICE 2,214,646

METAL COATED PLASTIC MATERIAL AND METHOD OF PRODUCING THE SAME

Bernard F. Walker, Cedarhurst, N. Y., assignor to Metaplast Corporation, New York, N. Y., a corporation of New York No Drawing. Application May 23, 1938, Serial No. 209,525

2 Claims. (Cl. 204—30)

This invention relates to a process for metalizing plastic materials, such as hard rubber, phenol condensation products, urea resins, synthetic resins, cellulosic plastic materials or materials coated therewith and has for an object to provide a convenient, dependable, and comparatively inexpensive process for the above purpose.

Another object of the invention is to provide a process for treating the surface of a plastic material of the above type so that an adherent metal coating may be applied thereto.

Another object is to provide a novel and improved process for applying to the surface of a plastic material a conductive layer having characteristics suitable for subsequent electroplating.

A further object is to provide a process of the above type which is adapted to apply the metalized or coated layer in the form of a design.

A further object is to provide a process for stenciling a metalized coating on a plastic material.

A still further object is to provide a plastic material having a coating of the above type.

Various other objects and advantages will be apparent as the nature of the invention is more fully disclosed.

Although the novel features which are characteristic of this invention are pointed out more particularly in the claims appended hereto, the invention itself may be better understood by referring to the following description in which certain specific embodiments thereof are set forth for purposes of illustration.

Certain specific terms are used herein to refer to various details of the invention. It is to be understood, however, that these terms are to be given as broad an interpretation as the state of the art will permit.

The present process comprises in general so treating the surface of a plastic material that an adherent metalized layer may be applied thereto. This layer may be used for the subsequent electroplating or, in certain instances, may be polished or otherwise treated to provide the finished surface.

It has been found that plastic materials of the type above referred to, and particularly the synthetic plastics having a hard surface, must be pretreated so as to reduce the surface to a form adapted to receive the metalized coating. This pretreatment produces a physical and chemical change in the surface which, although not always apparent from an inspection of the surface, is such as to cause the metalized coating to adhere thereto. I have attributed this result to the depolymerization of the portion of the surface so treated. It is to be understood, however, that this term is not used in a restricted chemical sense, but instead applies to the change in the nature of the surface which is produced by the process herein described.

More specifically, the material may first be depolished and cleaned. It is then treated with the depolymerizing substance for a suitable length of time to reduce the surface to the desired condition. The depolymerizing substance is then removed, the material washed, and a suitable silver solution is applied to deposit the silver on the surface as a metalized coating. This coating is sufficiently adherent to be polished and used as such, or may be used as a vehicle for the subsequent electroplating of the metalized portion.

As an example of one method of carrying out this process, the material, such as a phenol condensation product or other synthetic resin, may first be depolished, either by chemical means, such as by the use of a reagent having the property of depolishing the surface, or by mechanical means, such as by sand blasting. The material is then cleansed of all foreign substances by the use of a suitable solvent, such as gasoline. The object after having been thus depolished and cleansed is now placed in a stannous chloride solution. This solution reverses the polymerization or other action to which the material has been subjected and which has rendered the surface immune to the action of most chemicals and solvents and depolymerizes or otherwise alters the condition of the surface so that a definite affinity is produced for the metal which is to be deposited thereon. The stannous chloride solution is preferably of a concentration such that a milklike consistency is obtained and must be constantly agitated during use to keep the stannous chloride in solution. The time required for the depolymerization is dependent upon the hardness of the surface. Some materials, such as phenol condensation products, require, for example, one hour for depolymerization, whereas other materials, such as hard rubber may require thirty minutes. These periods are given merely as illustrations and not as a limitation of the invention.

After the surface has been properly depolymerized as above, the stannous chloride solution is removed from contact therewith and the surface is washed with water to effect as complete a removal as possible of the reagent. The surface is then subjected to a silver bath to precipitate the silver thereon. This silver bath may comprise a water solution of sodium potassium tartrate and silver nitrate which is mixed with a solution of silver nitrate and ammonia and applied to the surface under conditions such that the sodium potassium tartrate precipitates the silver from the silver nitrate on to the surface. The thickness of the layer of silver thus precipitated will depend in general upon the length of time that the silver nitrate solution is in contact with the surface. Preferably the solution is constantly agitated or caused to flow over the surface so that a fresh part of the solution is always in contact therewith. If, after one treatment of this type, the object is not uniformly coated, the operation may be repeated until a coating of the desired consistency and thickness is built up on the depolymerized surface. The metalized surface may now be polished and it may be suitable for certain ornamental purposes. If desired, however, the metalized surface may be used as a conductor for the electroplating of any desired metal thereon.

For this purpose the object is placed in the usual electrolyte having a composition depending upon the metal to be deposited and the metalized coating may be used as a cathode on to which the metal is applied in the usual manner. The metal coating thus applied will adhere sufficiently to permit buffing and polishing and to produce a finish resembling a metal article.

In the above process it is to be understood that certain of the steps may be omitted in various instances, depending upon the condition of the material and the type of coating required. For example, if the metalized coating is to comprise the finished surface, particularly in the case of cast resins and thermoplastic materials, the preliminary depolishing may be omitted. It may also be omitted if only a thin plating is to be added which does not have sufficient tensile strength to be peeled from the surface, or if an extremely heavy plating is to be applied which would have sufficient strength in itself to resist the tendency to peel. For coatings having an intermediate thickness, however, which are sufficiently strong to be peeled from the surface, but are not sufficiently rigid to resist such action, the depolishing has been found to be advantageous.

This process is particularly adapted to ornamentation of plastic materials of the type above referred to inasmuch as it may be applied by means of a stencil. If, for example, the surface is covered by a suitable stencil after the depolishing, or if the surface is of such a nature that depolishing is not required, the steps of cleaning the surface, treating with stannous chloride and depositing the silver thereon from the silver nitrate solution may all be carried out in the presence of the stencil and will deposit the metal in the form of a stenciled design. Thereafter, if a subsequent electroplating is required, the metalized coating will serve to form the base for the electroplating and cause the latter to also assume the predetermined design.

Objects treated in this manner present the appearance of metal, but have a weight corresponding to that of the plastic and also have the advantage that they may be formed or molded in any desired shape much more readily and inexpensively than a metal article could be so formed and that, when coated, they serve as a substitute for the metal article.

The process is particularly adaptable for novelties, such as costume jewelry, ash trays, ornamental figures or the like.

Although a specific embodiment has been shown for purposes of illustration, it is to be understood that the invention is capable of various uses as will be readily apparent to a person skilled in the art. The invention is only to be limited in accordance with the following claims when interpreted in view of the prior art.

What is claimed is:

1. The method of ornamenting the surface of a plastic material which comprises sandblasting said surface under conditions to depolish the same, cleaning the surface of foreign substances, immersing the same in a stannous chloride solution for a period between about thirty minutes and one hour to cause the same to have characteristics suitable for metallizing, removing the surface from the stannous chloride bath, thoroughly washing the same to substantially completely remove the stannous chloride, treating the washed surface in a bath consisting of a mixture of an ammoniacal silver nitrate solution and a reducing solution under conditions to precipitate the silver on said surface in the form of an adherent metallized layer and utilizing said metallized layer as a cathode for the electrolytic deposition of a layer of metal thereon.

2. An article of manufacture comprising a plastic material having an adherent silver layer deposited thereon and firmly adherent thereto and a layer of metal electrolytically deposited on said first layer, said article being substantially identical with an article produced in accordance with the process set forth in claim 1.

BERNARD F. WALKER.